US012258121B2

(12) United States Patent
Fink et al.

(10) Patent No.: US 12,258,121 B2
(45) Date of Patent: Mar. 25, 2025

(54) ROTARY WING AIRCRAFT WITH A FIREWALL ARRANGEMENT HAVING AT LEAST ONE FUNNEL-SHAPED LOWER FIREWALL

(71) Applicant: AIRBUS HELICOPTERS DEUTSCHLAND GMBH, Donauwörth (DE)

(72) Inventors: Axel Fink, Donauwörth (DE); Manuel Kempf, Donauwörth (DE); Philipp Walch, Rain am Lech (DE); Luca Specht, Petershausen (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 0 days.

(21) Appl. No.: 18/631,332

(22) Filed: Apr. 10, 2024

(65) Prior Publication Data

US 2024/0367784 A1    Nov. 7, 2024

(30) Foreign Application Priority Data

May 5, 2023    (EP) .................................... 23171892

(51) Int. Cl.
*B64C 27/00*    (2006.01)
*B64C 1/12*    (2006.01)
(Continued)

(52) U.S. Cl.
CPC .............. *B64C 27/006* (2013.01); *B64C 1/12* (2013.01); *B64D 27/02* (2013.01); *B64D 45/00* (2013.01);
(Continued)

(58) Field of Classification Search
CPC .. A62C 2/06; A62C 2/065; A62C 3/08; B64D 2045/009; B64D 27/402; F02C 7/25
See application file for complete search history.

(56) References Cited

U.S. PATENT DOCUMENTS 5,458,343 A * 10/1995 Dornfeld ............... F01D 11/003
277/606
8,631,637 B2 * 1/2014 DeDe ........................ F02C 7/25
60/39.15
(Continued)

FOREIGN PATENT DOCUMENTS

EP    3932801 B1    1/2022

OTHER PUBLICATIONS

European Search Report for European Application No. EP 23171892. 5, Completed by the European Patent Office, Dated Oct. 18, 2023, 5 pages.

*Primary Examiner* — Philip J Bonzell
*Assistant Examiner* — Michael B. Kreiner
(74) *Attorney, Agent, or Firm* — BROOKS KUSHMAN P.C.

(57)    ABSTRACT

A rotary wing aircraft with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams; wherein the aircraft upper deck comprises an engine accommodating region with a firewall arrangement, the engine accommodating region accommodating at least one aircraft engine within the firewall arrangement such that the firewall arrangement defines a fire proof separation at least between the at least one aircraft engine and the aircraft interior region; and wherein the firewall arrangement comprises at least a funnel-shaped
(Continued)

lower firewall arranged between the at least one aircraft engine and the upper primary skin of the fuselage.

15 Claims, 8 Drawing Sheets

(51) Int. Cl.
    *B64C 27/06*     (2006.01)
    *B64D 27/02*     (2006.01)
    *B64D 45/00*     (2006.01)

(52) U.S. Cl.
    CPC ........ *B64C 27/06* (2013.01); *B64D 2045/009* (2013.01)

(56) References Cited

U.S. PATENT DOCUMENTS

| | | | |
|---|---|---|---|
| 8,820,045 B2 * | 9/2014 | DeDe | F01D 11/005 |
| | | | 60/800 |
| 9,868,545 B2 * | 1/2018 | Brochard | F02C 7/25 |
| 10,669,038 B2 * | 6/2020 | Scannell | B64D 33/02 |
| 10,689,126 B2 * | 6/2020 | Scannell | B64C 1/10 |
| 10,814,995 B2 * | 10/2020 | West | B64D 27/18 |
| 11,479,104 B2 * | 10/2022 | Appleby | B64D 27/402 |
| 11,820,485 B2 * | 11/2023 | Fink | B64C 27/04 |
| 11,865,382 B2 * | 1/2024 | Parsons | A62C 3/08 |
| 11,912,402 B2 * | 2/2024 | Vayssiere | B64C 27/00 |
| 2022/0055756 A1 * | 2/2022 | Basse | F02C 7/20 |
| 2024/0109666 A1 * | 4/2024 | Legras | B64D 33/04 |
| 2024/0367784 A1 * | 11/2024 | Fink | B64C 1/12 |

\* cited by examiner

ROTARY WING AIRCRAFT WITH A FIREWALL ARRANGEMENT HAVING AT LEAST ONE FUNNEL-SHAPED LOWER FIREWALL

CROSS-REFERENCE TO RELATED APPLICATION

This application claims priority to European patent application No. EP 23171892.5 filed on May 5, 2023, the disclosure of which is incorporated in its entirety by reference herein.

TECHNICAL FIELD

The present disclosure relates to a rotary wing aircraft with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams, wherein the aircraft upper deck comprises an engine accommodating region with a firewall arrangement, the engine accommodating region accommodating at least one aircraft engine within the firewall arrangement such that the firewall arrangement defines a fire proof separation at least between the at least one aircraft engine and the aircraft interior region, and wherein the firewall arrangement comprises at least a funnel-shaped lower firewall that is arranged between the at least one aircraft engine and the upper primary skin of the fuselage.

BACKGROUND

In a rotary wing aircraft, such as a small or medium-size helicopter, an associated fuselage typically comprises an upper primary skin that separates an aircraft interior region, which is formed by the fuselage, from an aircraft upper deck arranged above the fuselage. The aircraft interior region usually accommodates at least a cockpit and may further accommodate a cabin for passengers and/or cargo.

The aircraft upper deck generally includes an engine accommodating region that accommodates one or more engines, typically air breathing gas turbines, and that is, therefore, also referred to as the "engine deck". The one or more engines are adapted for driving the rotary wing aircraft, e. g. by providing power to an associated power distribution unit, such as a gear box, which then provides this power to a suitable propelling unit, such as e. g. a rotor, propeller or other.

Typically, the engines are arranged outside of the aircraft interior region, on top of the fuselage and close to the other main components of a respective powerplant, the main gear box and the main rotor. This is crucial for the entire aircraft performance, safety and reliability.

More specifically, according to airworthiness certification regulations the engine deck of a given rotary wing aircraft must be fire proof in a fire event. Basically, each engine has to be isolated from the rest of the rotary wing aircraft and the engine deck has to be designed such as to prevent corrosion and to prevent hazardous substances passing from a respective engine compartment to other parts of the rotary wing aircraft. Moreover, an associated primary structure enclosed within the engine compartment has to be capable of sustaining limit load during a fire event of 15 min of duration. Adequate assumptions have to be made regarding a possible size and location of damage on the primary structure of the rotary wing aircraft. No burn through or backside flame ignition is acceptable and respectively employed materials must behave self-extinguishing after flame exposure. These measures are independent of additional fire extinguishing systems.

In particular, the engine deck must be capable of sustaining service temperatures without deterioration of load carrying or fire proof capabilities. Respective operating temperatures acting on the aircraft upper deck as a whole are a result of the heat radiation of the engines and are essentially a function of the location within the engine compartment, the engine proximity, the compartment design and the engine characteristics among others. Typically, higher temperatures are present at the rear section of the engine compartment close to an associated engine combustion chamber and an associated exhaust. In fact, typical operating temperatures of the engine deck range from about 70° C. to 300° C.

As a result, each engine compartment and, more generally, the engine deck as a whole is equipped with a suitable firewall arrangement which forms a fire protection zone. The fire protection zone accommodates the engines within the firewall arrangement such that the firewall arrangement defines a fire proof separation between the engines, towards the forward and aft regions of the engine deck and the aircraft interior region formed by the fuselage of a given rotary wing aircraft.

More specifically, a firewall arrangement in an engine deck is typically delimited by the upper primary skin of the fuselage that forms a lower firewall, as well as by a front firewall, a rear firewall, and a cowling that represents an upper loft of a given rotary wing aircraft and covers the engine deck. If the rotary wing aircraft is a twin-engine aircraft, both engines are usually separated from each other by a center firewall protecting both engines from each other. In any case, the engines are attached to the upper primary skin and corresponding framework members such as beams or frames by means of several engine mounts. The front firewall and the rear firewall represent a barrier to respective front and rear portions of a given aircraft upper deck. The cowling is usually at least partially removable to provide access to the engines.

An illustrative firewall arrangement is described in the document EP 3 932 801 B1. More generally, the document EP 3 932 801 B1 describes a rotary wing aircraft with a fuselage that forms an aircraft interior region, the fuselage comprising an upper primary skin that separates the aircraft interior region from an aircraft upper deck arranged above the fuselage. The aircraft upper deck comprises an engine accommodating region with a firewall arrangement which accommodates two aircraft engines within the firewall arrangement such that the firewall arrangement defines a fire proof separation at least between the two aircraft engines and the aircraft interior region. The firewall arrangement comprises a mid firewall that separates the two engines from each other and further comprises, for each engine, a front firewall, a rear firewall, and a funnel-shaped lower firewall that is arranged between the aircraft engine and the upper primary skin of the fuselage. The funnel-shaped lower firewall converges from an outer perimeter to at least one inner collecting point. The outer perimeter is spaced apart from the upper primary skin of the fuselage and at least attached to the front firewall and the rear firewall.

More specifically, the funnel-shaped lower firewall features a particular funnel shape ensuring drainage and a specific separation distance with respect to respective primary structural elements of the aircraft upper deck which are to be protected. The particular funnel shape requires an interpenetration of the upper primary skin plane, leading to a cut-out of the upper primary skin. Thus, a respective lowest point of the funnel-shaped lower firewall is arranged in vertical direction of the rotary wing aircraft below the upper primary skin plane and incorporates a drainage point. The separation distance is an essential feature targeting an efficient protection of the aircraft upper deck's structural elements.

Furthermore, inside the firewall arrangement each aircraft engine is usually attached to a set of engine fixations which have to ensure an overall isostatic characteristic in order to avoid any constraining parasitic loading on either the aircraft engine or the fuselage as a result of relative, thermally or elastically induced dilatations and deformations. In general, at least three engine fixation points are provided on a respective casing of each aircraft engine. A set of mounts is attached to these engine fixation points and connects associated fixed brackets provided on the respective primary structural elements of the aircraft upper deck, such as e. g. the supporting beams. Similarly, in a conventionally implemented engine accommodating region on an aircraft upper deck that is formed as a titanium deck provided with a certain fire proofness capability instead of being provided with the firewall arrangement with the funnel-shaped lower firewall between the engine and the upper deck, the set of mounts is arranged on top of the titanium deck and interconnects respective supporting members below the upper primary deck so that the mounts bridge the distance between the engine fixation points and the fixed brackets provided on the respective primary structural elements of the aircraft upper deck. Typical mounts show a bipod machined design or a framework of struts.

Turning now back to the document EP 3 932 801 B1 which addresses the engine fixation points and the set of mounts within the perimeter of the funnel-shaped upper firewall, but which is entirely silent about the way of arranging them in order to ensure an undisturbed mechanical load path between the engine fixation points of the aircraft engines and the aircraft upper deck below the funnel-shaped lower firewall. This document is also silent on how to maintain a required fire-proofness capability within respective intersection points between the mechanical load path and the interposed funnel-shaped lower firewall, on how to minimize a respective mechanical interaction between the mechanical load path and the funnel-shaped lower firewall, and on how to allow an easy dismountability of the aircraft engine and the funnel-shaped lower firewall.

It is, therefore, an object of the present disclosure to provide a new rotary wing aircraft with an aircraft engine that is mounted to an engine accommodating region provided with a firewall arrangement that comprises at least one funnel-shaped lower firewall by means of an attachment arrangement that is at least suitable to ensure an undisturbed mechanical load path between respective engine fixation points and an aircraft upper deck below the funnel-shaped lower firewall. This object is solved by a rotary wing aircraft with the features of claim 1.

SUMMARY

More specifically, according to the present disclosure a rotary wing aircraft comprises a fuselage that forms an aircraft interior region, the fuselage comprising an upper primary skin that separates the aircraft interior region from an aircraft upper deck arranged above the fuselage, the upper primary skin being mounted on top of a predetermined number of supporting beams. The aircraft upper deck comprises an engine accommodating region with a firewall arrangement. The engine accommodating region accommodates at least one aircraft engine within the firewall arrangement such that the firewall arrangement defines a fire proof separation at least between the at least one aircraft engine and the aircraft interior region. The firewall arrangement comprises at least one funnel-shaped lower firewall that is arranged between the at least one aircraft engine and the upper primary skin of the fuselage. The at least one funnel-shaped lower firewall is spaced apart from the upper primary skin by a predetermined separation distance and converges from an outer perimeter to at least one inner collecting point of the at least one funnel-shaped lower firewall. Furthermore, the at least one funnel-shaped lower firewall comprises at least an outer support surface with a through-hole through which an outer main mount bracket extends at least partly, the outer main mount bracket comprising an outer main mount bracket web that is rigidly attached to a beam web of at least one beam of the predetermined number of supporting beams. The outer main mount bracket further comprises a plateau abutting against the outer support surface, the plateau being provided with an outer main mount fixation extending through the through-hole of the outer support surface, the outer main mount fixation being connected to an outer main mount that is attached to the at least one aircraft engine.

In the rotary wing aircraft according to the present disclosure the aircraft upper deck represents the structural platform of the engine accommodating region wherein the aircraft engine is arranged. The aircraft upper deck is located on the upper primary skin which is internally supported by a set of frames and beams comprising the predetermined number of supporting beams. More particularly, longitudinal and transversal beams are used to react vertical loads introduced by the aircraft engine(s). Therefore, a direct fixation of the outer mount bracket to the aircraft upper deck and its supporting beams is advantageously provided.

More specifically, the engine accommodating region represents a volume which encloses the aircraft engine and which is preferably delimited by the firewall arrangement, i. e. by a mid firewall, a front firewall, a rear firewall, and the funnel-shaped lower firewall, as well as a cowling. The funnel-shaped lower firewall is installed above the upper primary skin and arranged distantly apart from the upper primary skin, and it is preferably designed to protect the upper primary skin and the predetermined number of supporting beams, as well as the aircraft interior region from higher impacting temperatures at operational conditions, but more especially in a fire scenario. This is particularly advantageous when using composite materials for the upper primary skin and/or the firewall arrangement instead of fire-resistant titanium.

Furthermore, one major characteristic defining the thermal and fire protection capability of the funnel-shaped lower firewall is its separation distance with respect to the structural members of the aircraft upper deck that is to be protected. The protection capability increases as the relative distance between the structural members and the firewall arrangement is enlarged. Therefore, the funnel-shaped lower firewall is advantageously interposed between the aircraft engine and the aircraft upper deck, keeping a maximum separation distance to the upper primary skin in order to achieve maximum protection capabilities to respective primary fuselage components. The aircraft engine, in turn, is advantageously fixedly attached to the aircraft upper deck with its supporting beams, the fixations bridging the separation distance between the aircraft engine and the supporting beams, and an adequate sealing and fixation of the funnel-shaped lower firewall is preferably ensured at the outer support surface.

In addition, the fixation of the funnel-shaped lower firewall at the outer mount bracket does not interfere the direct load path of the outer mount bracket through the funnel-shaped lower firewall. Furthermore, the aircraft engine is easily removable without any effect on the funnel-shaped lower firewall and the funnel-shaped lower firewall is easily removable without the need to detach any part of the outer mount bracket on the aircraft upper deck. Moreover, the upper outer mount is advantageously not negatively impacted by the thermo-elastic behavior of the aircraft engine and the outer mounting bracket. For instance, thermally induced dilatations may not excite severe parasitic loadings neither on the funnel-shaped lower firewall, nor on the outer mounting bracket and the outer mount bracket, and may not lead to leakages which excite a loss of fire proofness capabilities.

According to some embodiments, the rotary wing aircraft further comprises a cover plate that is rigidly attached to the plateau for clamping the at least one funnel-shaped lower firewall between the cover plate and the plateau.

According to some embodiments, the rotary wing aircraft further comprises a sealing element clamped between the cover plate and the at least one funnel-shaped lower firewall and/or between the plateau and the at least one funnel-shaped lower firewall for sealing the at least one funnel-shaped lower firewall.

According to some embodiments, the outer main mount bracket web comprises an upper web section extending from the plateau to the beam web of the at least one beam over the predetermined separation distance, and a lower web section that is rigidly attached to the beam web of the at least one beam.

According to some embodiments, the rotary wing aircraft further comprises at least one stiffening rib, wherein the at least one stiffening rib is arranged between the at least one funnel-shaped lower firewall and the upper primary skin, and wherein the upper web section comprises a support rib that is rigidly attached to the at least one stiffening rib.

According to some embodiments, the outer main mount fixation comprises at least one mounting lug, and the outer main mount is rotatably mounted to the at least one mounting lug via at least one spherical bearing.

According to some embodiments, the outer main mount is embodied as a triangular mounting element that is connected to the outer main mount fixation via two spherical bearings.

According to some embodiments, the outer main mount is rotatably mounted to an outer main mounting bracket that is rigidly attached to the at least one aircraft engine.

According to some embodiments, the outer main mount is rotatably mounted to the outer main mounting bracket via a spherical bearing.

According to some embodiments, the at least one funnel-shaped lower firewall further comprises an inner support surface with a through-hole through which an inner main mount bracket extends at least partly, wherein the inner main mount bracket is connected to an inner main mount that is attached to the at least one aircraft engine.

According to some embodiments, the inner main mount is rotatably mounted to an inner main mounting bracket that is rigidly attached to the at least one aircraft engine.

According to some embodiments, the inner main mounting bracket is further rotatably mounted to an inner lateral mount that is connected to an inner lateral mount bracket.

According to some embodiments, the inner main mount bracket is rigidly attached to a beam web of at least one other beam of the predetermined number of supporting beams.

According to some embodiments, the at least one funnel-shaped lower firewall further comprises a rear support surface with a rear through-hole through which a rear mount bracket extends at least partly, wherein the rear mount bracket is connected to a rear mount that is attached to the at least one aircraft engine.

According to some embodiments, the upper primary skin of the fuselage comprises at least one cut-out, and a center portion of the at least one funnel-shaped lower firewall is arranged inside of the at least one cut-out.

In an illustrative realization of the rotary wing aircraft according to the present disclosure at least one aircraft engine and, preferably, each aircraft engine is accommodated in the engine accommodating region and fixedly attached by means of a new engine attachment arrangement at several associated attachment points. At least one attachment point encloses an engine mount, e. g. the outer mounting bracket, and a mount bracket, e. g. the outer mount bracket. The engine mount is confined within a respective engine compartment formed in the engine accommodating region above the funnel-shaped lower firewall, whereas the mount bracket is allocated below the funnel-shaped lower firewall but incorporates an extension, e. g. the upper outer mount, intersecting the funnel-shaped lower firewall and upwardly protruding into the engine compartment. The respective intersection defines an engine fixation intersection point. At the engine fixation intersection point the funnel-shaped lower firewall is provided with a corresponding opening allowing pass-through of the mount bracket's protruding extension. The engine mount attaches at least at one fixation point to the protruding extension of the mount bracket and at one engine fixation point to the aircraft engine.

Advantageously, the protruding extension of the mount bracket above the funnel-shaped lower firewall represents a "hard point" for the attachment of the engine mount, being stable in all directions. There is no relative movement of the engine mount that has to be accounted for at the intersection to the funnel-shaped lower firewall as it would be the case if e.g., state-of-art solutions would be used with continuous struts or bipods interpenetrating the funnel-shaped lower firewall and connecting the engine mount directly to the supporting beam of the aircraft upper deck.

Preferably, the mount bracket is embodied with an upper web and a lower web and only transfers loads introduced by a respective main mount formed e. g. by the upper outer mount interconnected at a respective mount fixation point (s), within its mount plane which is defined by a respective engine fixation point and the respective mount fixation point(s). The main mount represents a pendulum link connecting the engine fixation point and the mount fixation point(s), only transferring loads within the mount plane. Rotations may be kept free by using spherical bearings at each one of these fixation points. This is especially advantageous in view of the relative thermo-elastic and elasto-mechanic deformations which should not introduce constrained parasitic loads on the attachment parts. Hence, the protruding extension of the mount bracket is preferably a lug designed to accommodate a fixation bolt which is oriented perpendicular to the mount bracket and, thus, to the upper and lower bracket webs and the mount plane.

The lower web and upper webs of the mount bracket are preferably aligned to each other and the engine mount is preferably aligned with the upper and lower webs so as to avoid any offset in the load path and any resulting parasitic loading. The upper web extends between the funnel-shaped lower firewall and the aircraft upper deck, whereas the lower web extends below the aircraft upper deck aside a respective cut-out in the upper primary skin. The distance between the funnel-shaped lower firewall and the aircraft upper deck defines the separation distance which is considered essential to ensure the thermal and fire protection of the aircraft upper deck (upper primary skin and supporting beams). The upper web of the mount bracket bridges the separation distance, whereas the lower web overlaps and interconnects, preferably by riveting, the web of a corresponding supporting beam allocated below the upper primary skin close to the border of the upper primary skin's cut-out.

More specifically, the borders of the upper primary skin's cut-out may be stiffened by supporting beams (longitudinal and transversal) arranged below the upper primary skin. The webs of these supporting beams may be used to interconnect the upper and lower webs of the corresponding mount brackets. That means, each (main) front mount bracket is preferably provided with one longitudinal beam aligned with the longitudinal borders of the upper primary skin's cut-out, and each rear mount is preferably provided with a transversal beam which is aligned with the rear transversal border of the upper primary skin's cut-out.

Preferably, the uppermost end of the mount bracket's upper web incorporates a plateau which extends laterally with respect to the upper web and offers a supporting area for a corresponding plateau of the funnel-shaped lower firewall. The plateau of the funnel-shaped lower firewall is preferentially arranged on top of the mount bracket's plateau within a contact area around a respective opening in the funnel-shaped lower firewall.

A cover plate provided with a cover plate opening allowing the pass-through of the mount bracket's protruding extension may be installed on top of both the mount bracket's plateau and the plateau of the funnel-shaped lower firewall in the contact area around the funnel-shaped lower firewall's opening, the funnel-shaped lower firewall being, thus, locally sandwiched between the cover plate and the mount bracket's plateau. For instance, a set of fixation screws may be used to clamp the funnel-shaped lower firewall around the funnel-shaped lower firewall's opening between the cover plate and the mount bracket's plateau. The border of the local openings of the funnel-shaped lower firewall and the area of contact between the cover plate, the mount bracket's plateau and the funnel-shaped lower firewall may be covered with a seal, the sealing function being secured by the appropriate size of the overlapping contact area, the amount and allocation of the fixation screws and the adjustment of their torque via the installation torque.

In other words, the funnel-shaped lower firewall rests on top of the mount bracket's plateau that is clamped by the cover plate via the fixation screws. Thus, the isolation between a respective engine compartment above the funnel-shaped lower firewall and an aircraft interior region below the funnel-shaped lower firewall may easily be adjusted by tailoring a respective overlap contact area, a respective interleaf sealing and torque applied to the fixation screws. However, advantageously no fixation screws are involved within the primary load path of the engine attachment. The clamped fixation of the funnel-shaped lower firewall preferably exhibits a floating characteristic being inherently able to compensate tolerances.

Advantageously, the engine attachment enables an easy dismounting ability of the aircraft engine and the engine mounts without the need to intervene on the funnel-shaped lower firewall. Likewise, the funnel-shaped lower firewall may be removed without the need to intervene on the mount brackets.

Moreover, the mount bracket may implement a mount support rib, i. e. a supporting rib within the upper web which is preferably interconnected to a corresponding support rib fixedly attached on top of the upper primary skin and the side shell. This mount support rib advantageously provides for a stiff lateral support of the mount bracket's upper web within the separation distance.

Preferably, each one of the several attachment points is embodied similarly, i. e. at least functionally identically. For instance, mounting of each aircraft engine of the rotary wing aircraft may be accomplished by two front main mounts, one rear mount, and one lateral mount. The lateral mount and the rear mount preferably represent a two-dimensional link or strut defining a working line. The working line of the rear mount is preferably vertical, whereas the working line of the lateral mount is preferably lateral and inclined. The main mounts preferably exhibit a triangular shape with one fixation point to an associated aircraft engine, and two fixation points to the mount bracket. These three fixation points define a mount working plane. Preferentially, the upper and lower webs of the mount bracket extend in the same plane or at least in a plane parallel to the mount working plane so as to avoid any offsets and parasitic loadings. An associated web of a supporting beam below the upper primary skin, to which the mount bracket's lower web is e. g. riveted, is preferably arranged in parallel to the mount working plane. The mount working plane may be arranged in parallel to an aircraft engine's axis. The mount working plane may also be arranged in parallel to a respective longitudinal axis of the rotary wing aircraft.

Advantageously, there is no interruption within a respective mechanical load path of the mount bracket, meaning that the load acting on the main mounts and the rear mount above the funnel-shaped lower firewall is directly transferred to the supporting beam below the upper primary skin without interruption and without offsets. The engine fixation load is transferred by shear into the corresponding supporting beam.

More specifically, all supporting beams used to react the engine fixation loads are simultaneously used to reinforce respective free borders of the upper primary skin's cut-out. This means that the upper primary skin's cut-out perimeter is at least partially delimited by the supporting beams of the aircraft upper deck. This leads to a lateral separation distance in addition to the vertical separation distance, thus, additionally improving the protection of the upper primary skin.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
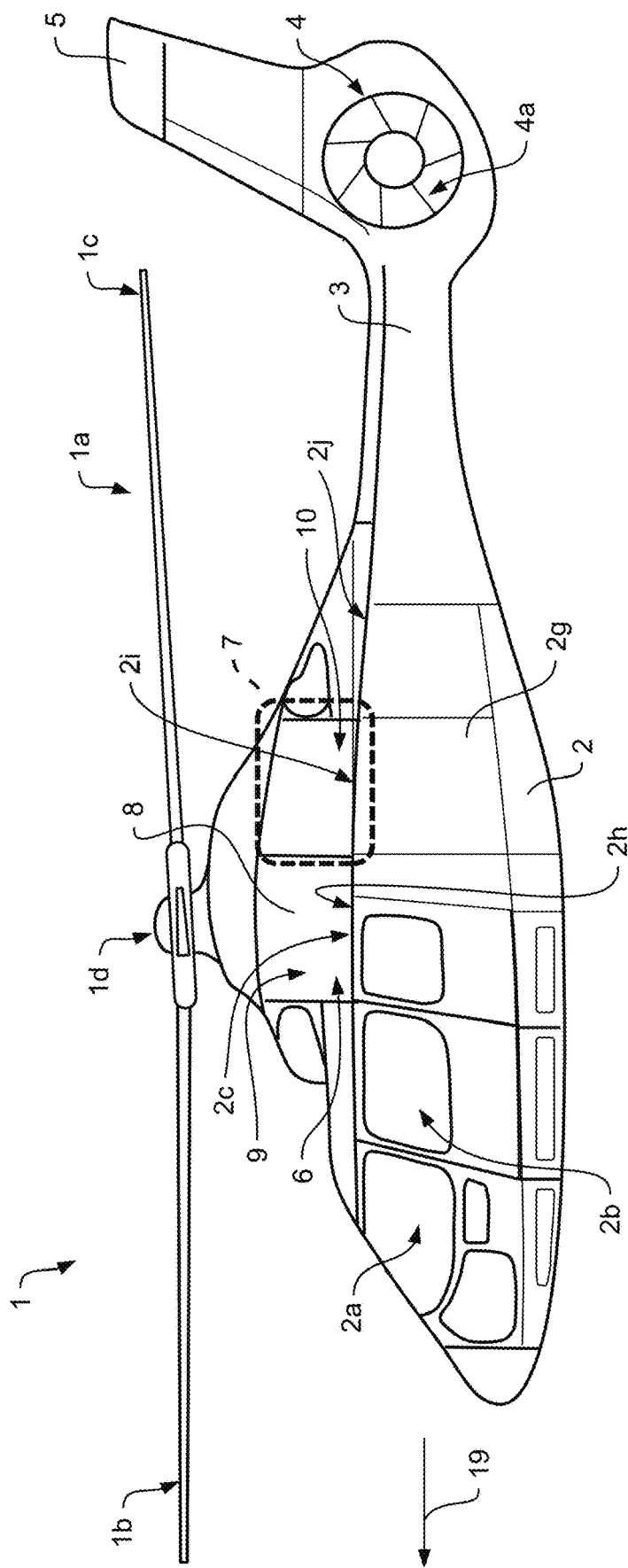
FIG. 1 shows a lateral view of a rotary wing aircraft with an engine accommodating region according to the disclosure, which is covered by a cowling.

FIG. 1 shows a rotary wing aircraft 1 with a longitudinal axis 19, which is exemplarily illustrated as a helicopter. Thus, for purposes of simplicity and clarity, the rotary wing aircraft 1 is hereinafter referred to as the "helicopter 1". The present disclosure is, however, not limited to helicopters and can likewise be applied to any other vehicle, in particular to vehicles wherein fluids, especially flammable fluids, must be canalized in specific situations towards one or more associated drainage points.

Preferably, the helicopter 1 comprises at least one multi-blade main rotor 1a for providing lift and forward or backward thrust during operation. The at least one multi-blade main rotor 1a preferentially comprises a plurality of rotor blades 1b, 1c that are mounted at an associated rotor head 1d to a rotor shaft, which rotates in operation of the helicopter 1 around an associated rotor axis.

Illustratively, the helicopter 1 comprises a fuselage 2 that forms an aircraft interior region 2a, 2b. The aircraft interior region 2a, 2b preferably accommodates at least a cockpit 2a and may further accommodate a cabin 2b for passengers and/or cargo. By way of example, a tail boom 3 is connected to the fuselage 2 of the helicopter 1.

The helicopter 1 illustratively further comprises at least one preferentially shrouded counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

According to one aspect, the fuselage 2 comprises an upper primary skin 2c that separates the aircraft interior region 2a, 2b from an aircraft upper deck 6 arranged above the fuselage 2. In other words, the upper primary skin 2c forms an upper end of the fuselage 2.

Illustratively, the upper primary skin 2c includes a front deck skin 2h, an engine deck skin 2i, and a rear deck skin 2j. The front deck skin 2h is associated with a main gear box compartment 9 and the engine deck skin 2i is associated with an engine deck (6a in FIG. 2), both of which are part of the aircraft upper deck 6. The engine deck illustratively forms an engine accommodating region 7 with a firewall arrangement 10. Preferably, the aircraft upper deck 6 and, more particularly, at least the engine deck is covered by a cowling 8 that is mounted on top of the fuselage 2.

Preferably, the fuselage 2 includes side shells 2g (and 2f in FIG. 2) which illustratively encase the aircraft interior region 2a, 2b and which are mounted to interconnected frames (e.g., front frame 2d and rear frame 2e in FIG. 2) and longitudinal beams (2k in FIG. 5) to form a primary structure of the helicopter 1 that is designed and adapted for global and local load carrying duties. Thus, the fuselage's upper primary skin 2c is also involved in these global load carrying duties and, consequently, contributes to global load carrying of the fuselage 2.

Figure 2:
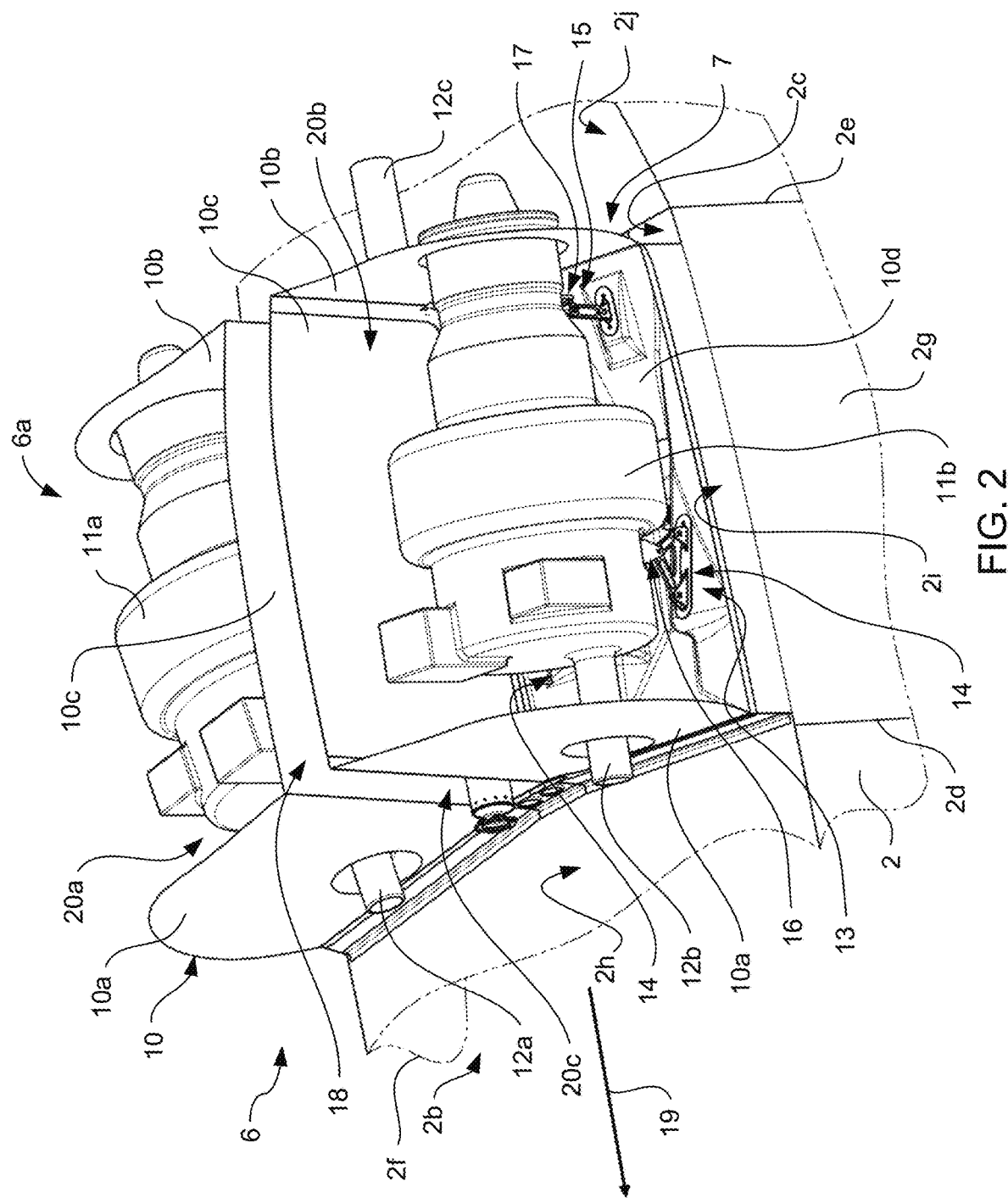
FIG. 2 shows a perspective view of the engine accommodating region of FIG. 2 without the cowling.

FIG. 2 shows the engine deck 6a of FIG. 1 which is part of the aircraft upper deck 6 of the helicopter 1 of FIG. 1 and that forms the engine accommodating region 7 with the firewall arrangement 10. The engine deck 6a is arranged above the fuselage 2 of FIG. 1, which includes by way of example the side shell 2g and a further side shell 2f, which encompass the aircraft interior region 2b. Both side shells 2f, 2g are at least mounted to first and second frames 2d, 2e of the fuselage 2, which are associated with the engine deck 6a and, therefore, also referred to as the "front frame 2d" and the "rear frame 2e", for simplicity and clarity. By way of example, the front and rear frames 2d, 2e delimit the engine deck 6a, i. e. the engine accommodating region 7, in the longitudinal direction of the helicopter 1 of FIG. 1, i. e. in direction of the longitudinal axis 19 of FIG. 1.

According to one aspect, the engine accommodating region 7 accommodates at least one aircraft engine within the firewall arrangement 10 such that the firewall arrangement 10 defines a fire proof separation at least between the at least one aircraft engine and the aircraft interior region 2b (and 2a in FIG. 1).

More generally, the firewall arrangement 10 preferably defines a fire proof separation between the at least one aircraft engine and other adjacent aircraft regions. Such other adjacent aircraft regions include the aircraft interior region 2b (and 2a in FIG. 1), as well as e. g. an engine compartment(s) of a further aircraft engine(s), and forward and aft regions to the engine accommodating region 7, such as e. g. gear box or exhaust accommodating regions.

Illustratively, the engine accommodating region 7 accommodates two aircraft engines 11a, 11b within the firewall arrangement 10. Each aircraft engine 11a, 11b is preferably arranged in an associated engine compartment 20a, 20b. By way of example, two adjacent engine compartments 20a, 20b are provided.

Preferably, the two aircraft engines 11a, 11b are embodied as air breathing propulsion gas turbines, which combust a fuel/air mix for power generation. Illustratively, each aircraft engine 11a, 11b has an associated drive shaft 12a, 12b, e. g. for driving an associated main gear box of the helicopter 1 of FIG. 1.

According to one aspect, the two aircraft engines 11a, 11b and, thus, the two adjacent engine compartments 20a, 20b are separated from each other by means of two mid firewalls 10c of the firewall arrangement 10. The mid firewalls 10c preferably form a gap 18 that embodies a drive shaft channel 20c for a tail rotor drive shaft 12c.

The firewall arrangement 10 illustratively further includes for each one of the two adjacent engine compartments 20a, 20b at least a front firewall 10a and a rear firewall 10b. Preferably, each one of the front firewall 10a, the rear firewall 10b, and the mid firewall 10c of each one of the two adjacent engine compartments 20a, 20b comprises a fire proof material, including at least one of titanium, steel, ceramics, a polymeric composite, or a hybrid organic-inorganic composite. In one realization, at least one of the front firewall 10a, the rear firewall 10b, or the mid firewall 10c has a titanium skin with a minimum thickness of 0.4 mm, preferably with a thickness in a range from 0.6 mm to 0.8 mm.

Moreover, for each one of the two adjacent engine compartments 20a, 20b the firewall arrangement 10 preferably comprises in addition to the front firewall 10a, the rear firewall 10b, and the mid firewall 10c a funnel-shaped lower firewall 10d that is arranged between the aircraft engine 11b and the upper primary skin 2c of the fuselage 2. In FIG. 2, however, only the funnel-shaped lower firewall 10d for the engine compartment 20b is visible.

Preferably, the two adjacent engine compartments 20a, 20b and the firewall arrangement 10 of each one of the two adjacent engine compartments 20a, 20b are embodied with similar components. Therefore, hereinafter only the engine compartment 20b and the firewall arrangement 10 of the engine compartment 20b are representatively described in more detail.

By way of example, the front firewall 10a and the rear firewall 10b delimit the associated engine compartment 20b in the longitudinal direction 19, and the funnel-shaped lower firewall 10d forms a bottom of the engine compartment 20b therebetween. Preferably, the aircraft engine 11b is mounted to engine attachments 13 provided in the engine compartment 20b. More specifically, engine attachments 13 may include at least one front attachment 14, which is positioned in the longitudinal direction 19 on a front section of the funnel-shaped lower firewall 10d, and at least one rear attachment 15, which is positioned in the longitudinal direction 19 on a rear section of the funnel-shaped lower firewall 10d. Two front attachments 14 may be utilized and arranged, in a preferred embodiment, approximately symmetrically with respect to the aircraft engine drive shaft 12b on the transverse sides of the aircraft engine 11b, and one rear attachment 15 is arranged approximately on the axis of the aircraft engine drive shaft 12b. Thus, a stable triangular support structure is formed for the aircraft engine 11b and a triangular mounting plane (17a in FIG. 5) may be realized by such triangular support structure.

Moreover, each of the front attachments 14 may attach to the aircraft engine 11b via a front fixation point 16, and the rear attachment 15 may attach to the aircraft engine 11b via a rear fixation point 17. In FIG. 2, however, only one of the front fixation points 16, an outer main fixation point (16a in FIG. 3), of the front attachment 14 is visible.

Figure 3:
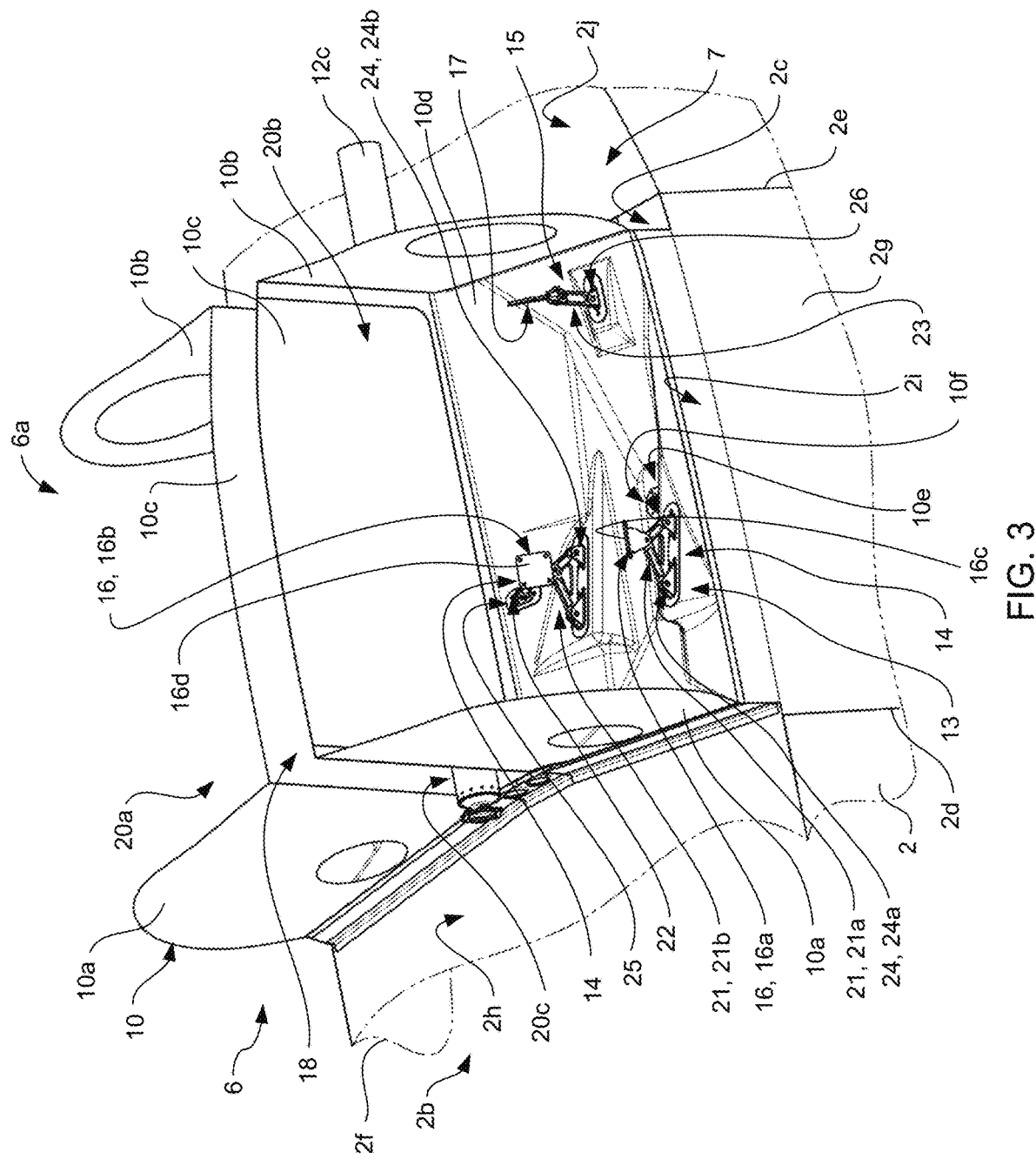
FIG. 3 shows a perspective view of the engine accommodating region of FIG. 2 without engines.

FIG. 3 shows the engine deck 6a within the aircraft upper deck 6 of FIG. 2 with the engine deck skin 2i, which forms the engine accommodating region 7 above the fuselage 2, where two adjacent and spaced apart arrangements of engine compartments 20a, 20b are formed by firewall arrangement 10. Each of the engine compartments 20a, 20b are formed with the front firewall 10a, the rear firewall 10b, the mid firewall 10c, and the funnel-shaped lower firewall 10d. The gap 18 is formed between the two mid firewalls 10c and embodies a drive shaft channel 20c for a tail rotor drive shaft 12c. However, in contrast to FIG. 2 the engine deck 6a is shown without the aircraft engines 11a, 11b of FIG. 2 to better illustrate arrangements of the front fixation points 16 of the front attachments 13, 14 and the rear fixation point 17 of the rear attachment 15.

According to one aspect, the front fixation points 16 may include an outer main fixation point 16a, which is positioned away from the mid firewall 10c, and an inner main fixation point 16b, which is positioned near the mid firewall 10c. Preferably, the outer main fixation point 16a may consist of an outer main mounting bracket 16c, an outer main mount 21a, and an outer main mount fixation 24a. Similarly, the inner main fixation point 16b may preferably consist of an inner main mounting bracket 16d, an inner main mount 21b, and an inner main mount fixation 24b. In other words, the outer main mount 21a and the inner main mount 21b together may be utilized as main mounts 21 of front fixation points 16 for mounting the aircraft engines 11b of FIG. 2, and the outer main mount fixation 24a and the inner main mount fixation 24b may be utilized as main mount fixations 24 of front fixation points 16 for fixing the main mounts 21 to the funnel-shaped lower firewall 10d.

More specifically, the outer main mount fixation 24a is preferably connected to the outer main mount 21a that is attached to the at least one aircraft engine 11b of FIG. 2, and the inner main mount fixation 24b is preferably connected to the inner main mount 21b that is attached to the at least one aircraft engine 11b of FIG. 2. By way of example, the outer main mount 21a is rotatably mounted to the outer mounting bracket 16c that is rigidly attached to the at least one aircraft engine 11b of FIG. 2, and the inner main mount 21b is rotatably mounted to the inner mounting bracket 16d that is rigidly attached to the at least one aircraft engine 11b of FIG. 2.

Preferably, the at least one aircraft engine 11b of FIG. 2 is further attached to a rear mount 23 via a rear mount fixation 26. According to one aspect, the inner mounting bracket 16d is further rotatably mounted to an inner lateral mount 22 that is connected to an inner lateral mount bracket (25a in FIG. 4) via an inner lateral mount fixation 25. As such, the isostatic fixation of each aircraft engine 11a, 11b of FIG. 2 is illustratively accomplished by two front main mounts 21a, 21b, one rear mount 23, and one inner lateral mount 22.

Preferably, at least one inner collecting point 10f may be formed on the funnel-shaped lower firewall 10d and positioned in the area between the three fixation points (two front fixation points 16 and one rear fixation point 17). Illustratively, the at least one inner collecting point 10f may be located in a recess between the two front fixation points 16 and in front of the rear fixation point 17.

Preferably, the funnel-shaped lower firewall 10d may converge from an outer perimeter (10g in FIG. 4) to the at least one inner collecting point 10f of the funnel-shaped lower firewall 10d. Illustratively, the at least one inner collecting point 10f of the funnel-shaped lower firewall 10d comprises a drainage 10e.

However, it should be noted that other embodiments of the funnel-shaped lower firewall 10d are likewise contemplated. For instance, the funnel-shaped lower firewall 10d may have two or more inner collecting points and, consequently, two or more associated funnel-shaped structures that are combined in the funnel-shaped lower firewall 10d.

Figure 4:
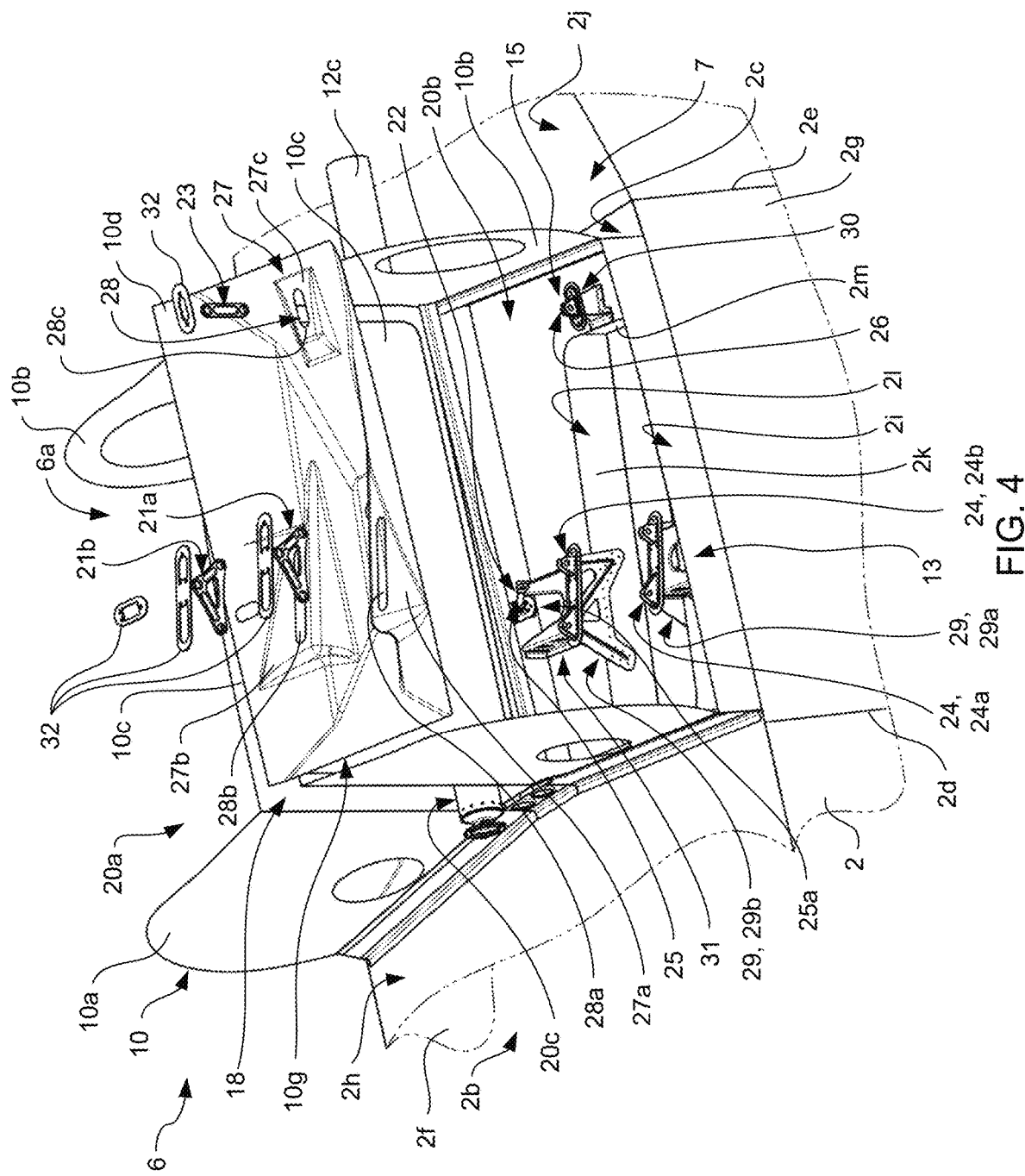
FIG. 4 shows a perspective view of the engine accommodating region of FIG. 3 with a disassembled engine compartment.

FIG. 4 shows the engine accommodating region 7 of FIG. 3 with a disassembled engine compartment 20b, where the main mounts 21a, 21b, inner lateral mount 22, rear mount 23, and funnel-shaped lower firewall 10d are partially disassembled from the engine compartment 20b to show the lower parts of the engine attachments 13 and the rear attachment 15.

By way of example, the at least one funnel-shaped lower firewall 10d comprises lower firewall support surfaces 27 consisting of an outer support surface 27a, an inner support surface 27b, and a rear support surface 27c. The outlines of the outer support surface 27a, the inner support surface 27b, and the rear support surface 27c form a lower firewall outer perimeter 10g of the funnel-shaped lower firewall 10d. Preferably, the funnel-shaped lower firewall 10d is provided with at least one lower firewall through-hole 28 on each of the outer support surface 27a, the inner support surface 27b, and the rear support surface 27c.

More specifically, the funnel-shaped lower firewall 10d preferably comprises the outer support surface 27a with an outer through-hole 28a through which an outer main mount bracket 29a extends at least partly. Preferably, the funnel-shaped lower firewall 10d further comprises the inner support surface 27b with an inner through-hole 28b through which an inner main mount bracket 29b extends at least partly. Illustratively, the inner support surface 27b may be provided with another inner through-hole 28b through which an inner lateral mount bracket 25a may extend at least partly.

Illustratively, the outer main mount bracket 29a may be provided with the outer main mount fixation 24a extending through the outer through-hole 28a of the outer support surface 27a, and the inner main mount bracket 29b may be provided with the inner main mount fixation 24b extending through the inner through-hole 28b of the inner support surface 27b. Preferably, the inner main mount bracket 29b is connected to the inner main mount 21b that is attached to the at least one aircraft engine 11b of FIG. 2.

In other words, the outer main mount bracket 29a and the inner main mount bracket 29b together may be utilized as main mount brackets 29. The main mount brackets 29 together with the main mount fixations 24 may extend from below the funnel-shaped lower firewall 10d to above the funnel-shaped lower firewall 10d to support the installation of the main mounts 21, namely the outer main mount 21a and the inner main mount 21b.

More specifically, the outer main mount fixation 24a may extend through the outer through-hole 28a of the outer support surface 27a and connect to the outer main mount 21a, and the inner main mount fixation 24b may extend through the inner through-hole 28b of the inner support surface 27b and connect to the inner main mount 21b.

According to one aspect, the funnel-shaped lower firewall 10d preferably further comprises the rear support surface 27c with a rear through-hole 28c through which a rear mount bracket 30 extends at least partly, wherein the rear mount bracket 30 is connected to the rear mount 23 that is attached to the at least one aircraft engine 11b of FIG. 2. Preferably, rear mount bracket 30 may be provided with the rear mount fixation 26 extending through the rear through-hole 28c of the rear support surface 27c.

According to one aspect, the upper primary skin 2c of the fuselage 2 may comprise at least one engine deck skin cut-out 2l. The at least one engine deck skin cut-out 2l is illustratively located below the lower firewall support surfaces 27. The main mount brackets 29 and rear mount bracket 30 may preferably be arranged along the borders of the engine deck skin cut-out 2l.

More specifically, the borders of the upper primary skin's cut-out, i.e., the engine deck skin cut-out 2l may be stiffened by supporting beams 2m (and 2k in FIG. 5) arranged below the upper primary skin 2c. The webs of these supporting beams 2m, 2k may be used to interconnect the upper and lower webs of the corresponding mount brackets 29, 30. That means, each (main) front mount bracket 29a, 29b is preferably provided with one longitudinal beam (2k in FIG. 5) aligned with the longitudinal borders of the engine deck skin cut-out 2l, and each rear mount 23 is preferably provided with a transversal beam 2m which is aligned with the rear transversal border of the engine deck skin cut-out 2l. Illustratively, the transversal beams 2m are provided under the upper primary skin 2c in the area in which the rear mount 23 is located such that the transversal beams 2m support the rear mount 23.

Preferably, at least one stiffening rib 31 is arranged between the funnel-shaped lower firewall 10d and the upper primary skin 2c. The at least one stiffening rib 31 is described in more detail in FIG. 5.

According to one aspect, several cover plates 32 may be provided for the main mounts 21, inner lateral mount 22, and the rear mount 23 for clamping the funnel-shaped lower firewall 10d. The arrangements of the cover plates 32 are described in more detail in FIG. 6.

Figure 5:
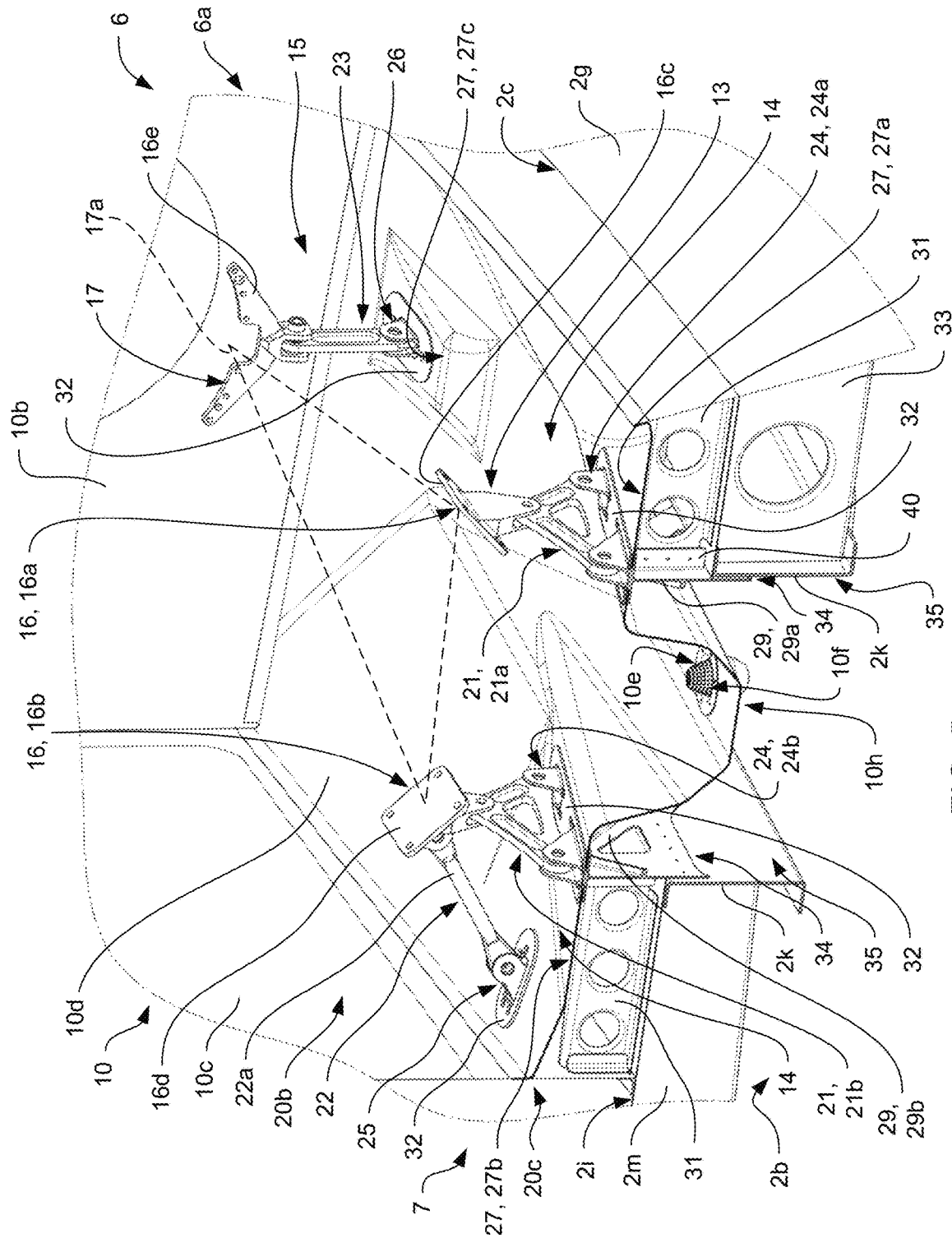
FIG. 5 shows a perspective, partially cut view of the engine compartment of FIG. 4.

FIG. 5 shows a partially cut view of the engine compartment 20b of FIG. 4, where the front attachments 14 at front fixation points 16a, 16b and the rear attachment 15 at rear fixation point 17 are illustratively forming a triangular mounting plane 17a above the lower firewall support surfaces 27 of the funnel-shaped lower firewall 10d.

More specifically, the triangular mounting plane 17a may be formed by the inner main mounting bracket 16d, the outer main mounting bracket 16c, and a rear mounting bracket 16e. By way of example, the rear mounting bracket 16e may be rigidly attached to the aircraft engine 11b of FIG. 2 and rotatably mounted to the rear mount 23.

According to one aspect, the inner main mounting bracket 16d may be further rotatably connected to a lateral strut 22a of the inner lateral mount 22. By way of example, the lateral strut 22a may define a working line of the inner lateral mount 22, which is preferably lateral and inclined. By way of example, the lateral strut 22a may be adjustable along the direction of the two-dimensional working line.

As mentioned above, preferably, at least one stiffening rib 31 is arranged between the funnel-shaped lower firewall 10d and the upper primary skin 2c. By way of example, an upper web section (39a in FIG. 6) of the main mount bracket webs (39 in FIG. 6) may include an outer main mount bracket support rib 40 that is rigidly attached to the stiffening rib 31. By way of example, an intercostal 33 may be arranged below the at least one stiffening rib 31.

According to one aspect, the upper primary skin 2c is preferably mounted on top of a predetermined number of supporting beams 2k. More specifically, the main mount brackets 29 may include main mount bracket webs (39 in FIG. 6) that are rigidly attached to beam webs 35 of at least one beam 2k of the predetermined number of supporting beams 2k.

Illustratively, a lower web of the inner main mount bracket 29b may overlap with and be attached, preferably by rivets, to the web of a corresponding supporting beam 2k located below the upper primary skin 2c close to the border of the engine deck skin cut-out 2l of FIG. 4, and thus create main bracket riveting areas 34 between the inner main mount bracket 29b and the corresponding supporting beam 2k. In other words, the inner main mount bracket 29b is rigidly attached to the beam web 35 of at least one beam 2k of the predetermined number of supporting beams 2k.

According to one aspect, a center portion 10h of the funnel-shaped lower firewall 10d is arranged inside of the at least one engine deck skin cut-out 2l of FIG. 4. Illustratively, the funnel-shaped lower firewall 10d may have the inner collecting point 10f with the drainage 10e within the lower firewall center portion 10h of the funnel-shaped lower firewall 10d. Preferably, a raised filter structure may be installed over the inner collecting point 10f to filter the liquid flowing through it.

Figure 6:
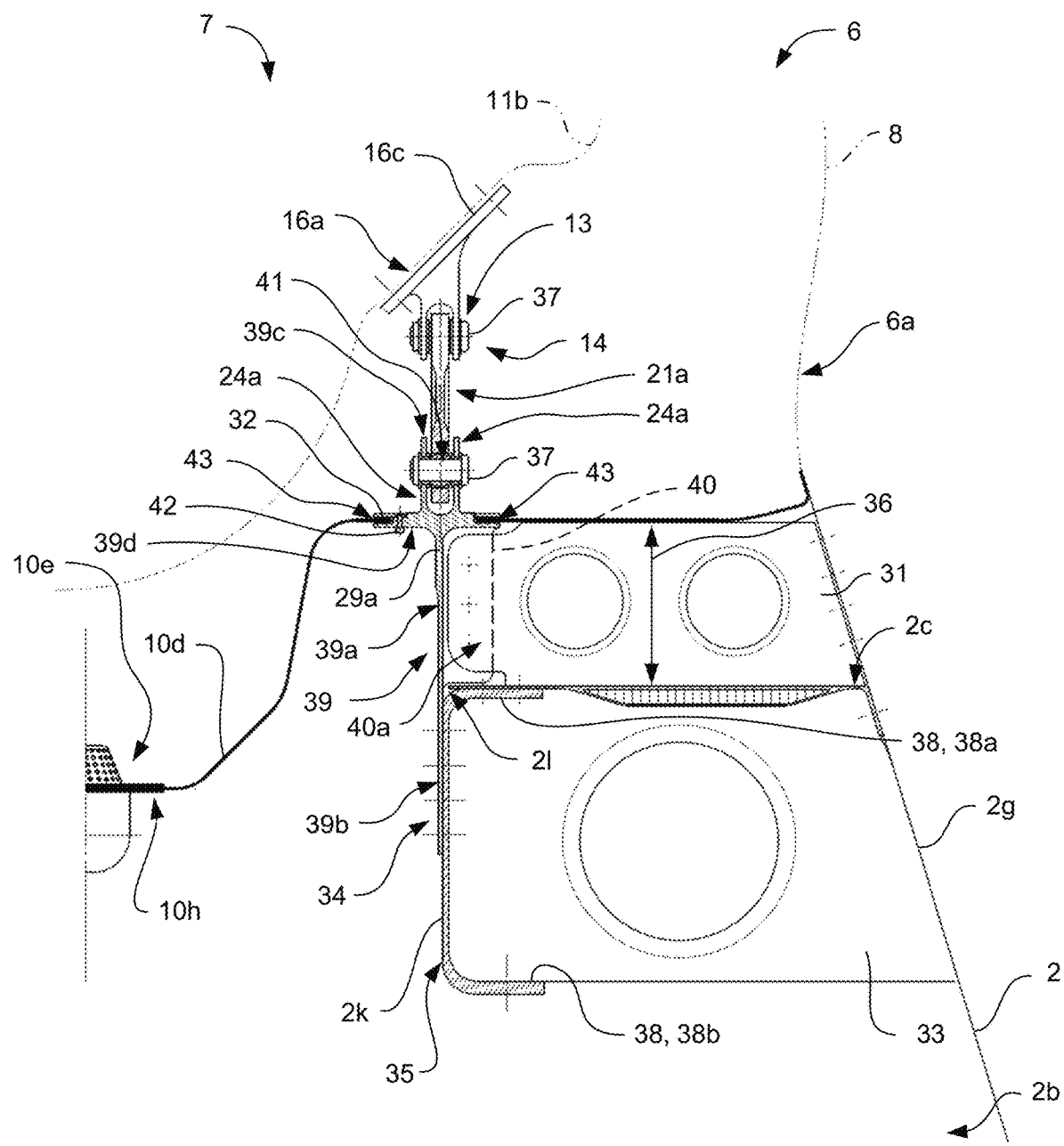
FIG. 6 shows a partially cut view of a section of the engine accommodating region of FIG. 5 further illustrating a front attachment.

FIG. 6 shows a partially cut view of a section of the engine accommodating region 7 of FIG. 5 further illustrating the front attachments 14. Preferably, the front attachments 14 at the outer main fixation point 16a and at the inner main fixation point 16b are embodied with similar components. Therefore, only the front attachment 14 at the outer main fixation point 16a and the surrounding support structures are representatively described hereinafter in more detail.

According to one aspect, the funnel-shaped lower firewall 10d may be spaced apart from the upper primary skin 2c by a predetermined separation distance 36 which is illustrated as a vertical separation distance 36. Illustratively, the outer main mount bracket support rib 40 may be rigidly attached to the stiffening rib 31. If desired, the outer main mount bracket support rib 40 may be riveted with in the vertical separation distance 36 to form a support rib riveting area 40a. By way of example, the stiffening rib 31 is riveted to the upper primary skin 2c and to the intercostal 33.

According to one aspect, the outer main mount fixation 24a may include at least one outer main mount bracket protruding lug 39c. Illustratively, the outer main mount fixation 24a of the outer main mount bracket 29a may include an outer main mount bracket protruding lug 39c designed to accommodate a main fixation bolt 37.

Preferably, the outer main mount bracket 29a may comprise the outer main mount bracket web 39 that is rigidly attached to the beam web 35. More specifically, the outer main mount bracket 29a preferably further comprises an outer main mount bracket plateau 39d abutting against the outer support surface (27a in FIG. 5). By way of example, the outer main mount bracket plateau 39d may be provided with the outer main mount fixation 24a.

Illustratively, the outer main mount bracket web 39 may include an outer main mount bracket upper web section 39a extending from the outer main mount bracket plateau 39d to the beam web 35 of the at least one beam 2k over the predetermined separation distance 36, and an outer main mount bracket lower web section 39b that is rigidly attached to the beam web 35 of the supporting beam 2k. By way of example, the outer main mount bracket plateau 39d extends laterally with respect to the upper web section 39a and offers a supporting area for a corresponding plateau of the funnel-shaped lower firewall 10d. The supporting beam 2k illustratively comprises beam flanges 38, wherein e. g. an upper beam flange 38a is riveted to the upper primary skin 2c and a lower beam flange 38b is riveted to a lower part of the intercostal 33.

Preferably, the cover plate 32 may be rigidly attached to the outer main mount bracket plateau 39d for clamping the at least one funnel-shaped lower firewall 10d between the cover plate 32 and the outer main mount bracket plateau 39d. By way of example, a sealing element 43 may be provided. The sealing element may be clamped between the cover plate 32 and the at least one funnel-shaped lower firewall 10d for sealing the at least one funnel-shaped lower firewall 10d. Alternatively or additionally, the sealing element 43 may be clamped between the outer main mount bracket plateau 39d and the at least one funnel-shaped lower firewall 10d. Illustratively, the cover plate 32 and the outer main mount bracket plateau 39d are rigidly attached via a fixation screw 42.

In some implementations, the outer main mount 21a is rotatably mounted to the at least one outer main mount bracket protruding lug 39c via at least one spherical bearing 41. Illustratively, the outer main mount 21a is embodied as a triangular mounting element that is connected to the outer main mount fixation 24a via two spherical bearings 41. If desired, the outer main mount 21a may be rotatably mounted to the outer main mounting bracket 16c via one spherical bearing 41.

Figure 7:
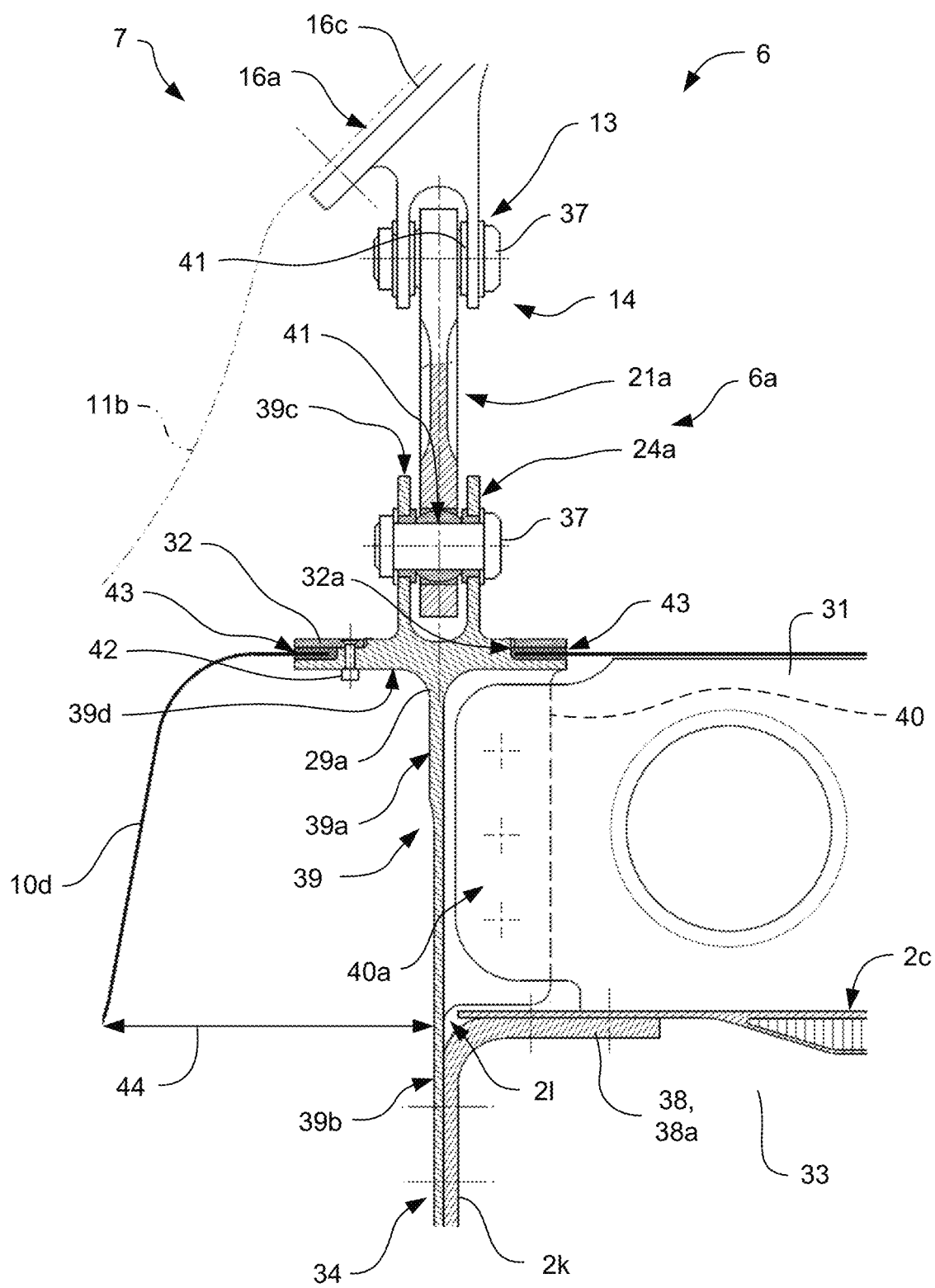
FIG. 7 shows an enlarged view of a section of FIG. 6 with the front attachment in assembled state.

FIG. 7 shows an enlarged view of a section of the engine accommodating region 7 of FIG. 6 with the front attachment 13 in assembled state. Illustratively, a cover plate opening 32a is provided along the outer edge of the cover plate 32 to accommodate the sealing element 43.

In some implementations, the cover plate 32 that is provided with the cover plate opening 32a may be installed on top of the outer main mount bracket plateau 39d. If desired, the funnel-shaped lower firewall 10d may be locally sandwiched in the contact area around the cover plate opening 32a between the cover plate 32 and the outer main mount bracket plateau 39d. For instance, fixation screws 42 may be used to clamp the funnel-shaped lower firewall 10d between the cover plates 32 and the outer main mount bracket plateau 39d.

Preferably, in the assembled state, a horizontal separation distance 44 is provided between the funnel-shaped lower firewall 10d forming the center portion 10h of FIG. 6 and the outer main mount bracket lower web section 39b.

Figure 8:
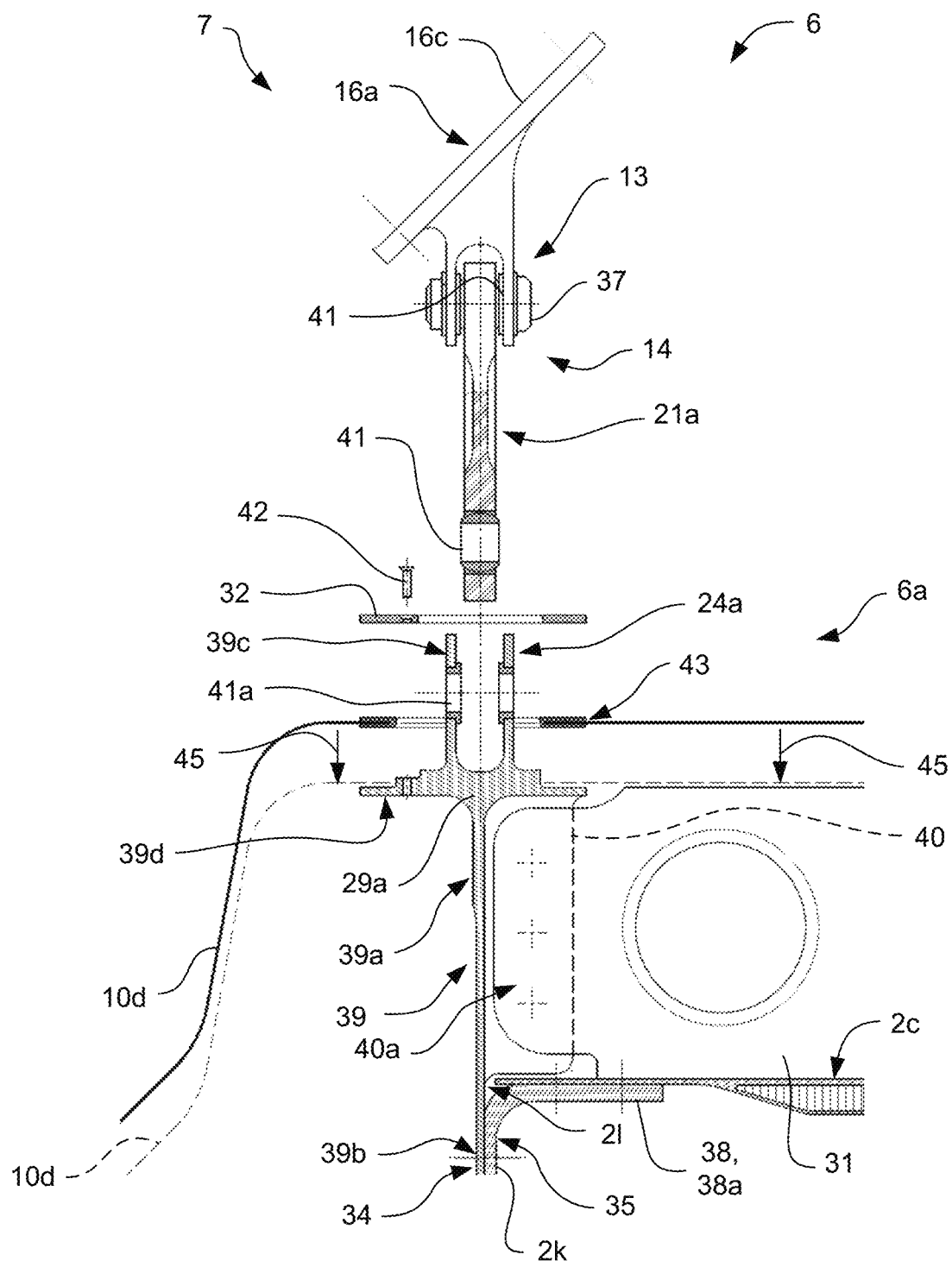
FIG. 8 shows the enlarged view of FIG. 7 with the front attachment in disassembled state.

FIG. 8 shows an enlarged view of a section of the engine accommodating region 7 of FIG. 7 with the front attachment 13 in disassembled state. Illustratively, the disassembled funnel-shaped lower firewall 10d and the outer main mount 21a may be attached to the outer main mount bracket 29a in mounting directions 45. Preferably, each outer main mount bracket protruding lug 39c of the outer main mount fixation 24a is provided with a flanged bush 41a for accommodating the spherical bearing 41.

It should be noted that modifications to the above described embodiments are within the common knowledge of the person skilled in the art and, thus, also considered as being part of the present disclosure. It should further be noted that the drawings are only intended for schematically representing embodiments of the present disclosure and not for showing detailed constructions thereof.

REFERENCE LIST 1 rotary wing aircraft
1a multi-blade main rotor
1b, 1c rotor blades
1d rotor head
2 fuselage
2a cockpit
2b cabin
2c upper primary skin of fuselage
2d front frame of engine deck
2e rear frame of engine deck
2f, 2g fuselage side shells
2h front deck skin
2i engine deck skin
2j rear deck skin
2k longitudinal beams
2l engine deck skin cut-out
2m transversal beams
3 tail boom
4 counter-torque device
4a tail rotor
5 fin
6 aircraft upper deck
6a engine deck
7 engine accommodating region
8 cowling
9 main gear box compartment
10 firewall arrangement
10a front firewalls
10b rear firewalls
10c mid firewalls
10d lower firewalls
10e drainage
10f inner collecting point
10g lower firewall outer perimeter 10h lower firewall center portion
11a, 11b aircraft engines
12a, 12b aircraft engine drive shafts
12c tail rotor drive shaft
13 engine attachments
14 front attachments
15 rear attachment
16 front fixation points
16a outer main fixation point
16b inner main fixation point
16c outer main mounting bracket
16d inner main mounting bracket
16e rear mounting bracket
17 rear fixation point
17a triangular mounting plane
18 gap between mid firewalls
19 longitudinal axis
20a, 20b engine compartments
20c tail rotor drive shaft channel
21 main mounts
21a outer main mount
21b inner main mount
22 inner lateral mount
22a lateral strut
23 rear mount
24 main mount fixations
24a outer main mount fixation
24b inner main mount fixation
25 inner lateral mount fixation
25a inner lateral mount bracket
26 rear mount fixation
27 lower firewall support surfaces
27a outer support surface
27b inner support surface
27c rear support surface
28 lower firewall through-holes
28a outer through-hole
28b inner through-hole
28c rear through-hole
29 main mount brackets
29a outer main mount bracket
29b inner main mount bracket
30 rear mount bracket
31 stiffening ribs
32 cover plates
32a cover plate opening
33 intercostal
34 main bracket riveting areas
35 beam webs
36 vertical separation distance
37 main fixation bolts
38 beam flanges
38a upper beam flange
38b lower beam flange
39 outer main mount bracket web
39a outer main mount bracket upper web section
39b outer main mount bracket lower web section
39c outer main mount bracket protruding lug
39d outer main mount bracket plateau
40 outer main mount bracket support rib
40a support rib riveting area
41 spherical bearings
41a flanged bush
42 fixation screw
43 sealing element
44 horizontal separation distance
45 mounting directions

What is claimed is:

1. A rotary wing aircraft with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams;

wherein the aircraft upper deck comprises an engine accommodating region with a firewall arrangement, the engine accommodating region accommodating at least one aircraft engine within the firewall arrangement such that the firewall arrangement defines a fire proof separation at least between the at least one aircraft engine and the aircraft interior region;

wherein the firewall arrangement comprises at least one funnel-shaped lower firewall that is arranged between the at least one aircraft engine and the upper primary skin of the fuselage, the at least one funnel-shaped lower firewall being spaced apart from the upper primary skin by a predetermined separation distance and converging from an outer perimeter to at least one inner collecting point of the at least one funnel-shaped lower firewall;

wherein the at least one funnel-shaped lower firewall comprises at least an outer support surface with a through-hole through which an outer main mount bracket extends at least partly, the outer main mount bracket comprising an outer main mount bracket web that is rigidly attached to a beam web of at least one beam of the predetermined number of supporting beams;

wherein the outer main mount bracket further comprises a plateau abutting against the outer support surface, the plateau being provided with an outer main mount fixation extending through the through-hole of the outer support surface, the outer main mount fixation being connected to an outer main mount that is attached to the at least one aircraft engine.

2. The rotary wing aircraft of claim 1, further comprising a cover plate that is rigidly attached to the plateau for clamping the at least one funnel-shaped lower firewall between the cover plate and the plateau.

3. The rotary wing aircraft of claim 2, further comprising a sealing element clamped between the cover plate and the at least one funnel-shaped lower firewall and/or between the plateau and the at least one funnel-shaped lower firewall for sealing the at least one funnel-shaped lower firewall.

4. The rotary wing aircraft of claim 1, wherein the outer main mount bracket web comprises an upper web section extending from the plateau to the beam web of the at least one beam over the predetermined separation distance, and a lower web section that is rigidly attached to the beam web of the at least one beam.

5. The rotary wing aircraft of claim 4, further comprising at least one stiffening rib, wherein the at least one stiffening rib is arranged between the at least one funnel-shaped lower firewall and the upper primary skin, and wherein the upper web section comprises a support rib that is rigidly attached to the at least one stiffening rib.

6. The rotary wing aircraft of claim 1, wherein the outer main mount fixation comprises at least one mounting lug, and wherein the outer main mount is rotatably mounted to the at least one mounting lug via at least one spherical bearing.

7. The rotary wing aircraft of claim 6, wherein the outer main mount is embodied as a triangular mounting element that is connected to the outer main mount fixation via two spherical bearings.

8. The rotary wing aircraft of claim 1, wherein the outer main mount is rotatably mounted to an outer main mounting bracket that is rigidly attached to the at least one aircraft engine.

9. The rotary wing aircraft of claim 8, wherein the outer main mount is rotatably mounted to the outer main mounting bracket via a spherical bearing.

10. The rotary wing aircraft of claim 1, wherein the at least one funnel-shaped lower firewall further comprises an inner support surface with a through-hole through which an inner main mount bracket extends at least partly, wherein the inner main mount bracket is connected to an inner main mount that is attached to the at least one aircraft engine.

11. The rotary wing aircraft of claim 10, wherein the inner main mount is rotatably mounted to an inner main mounting bracket that is rigidly attached to the at least one aircraft engine.

12. The rotary wing aircraft of claim 11, wherein the inner main mounting bracket is further rotatably mounted to an inner lateral mount that is connected to an inner lateral mount bracket.

13. The rotary wing aircraft of claim 10, wherein the inner main mount bracket is rigidly attached to a beam web of at least one other beam of the predetermined number of supporting beams.

14. The rotary wing aircraft of claim 1, wherein the at least one funnel-shaped lower firewall further comprises a rear support surface with a rear through-hole through which a rear mount bracket extends at least partly, wherein the rear mount bracket is connected to a rear mount that is attached to the at least one aircraft engine.

15. The rotary wing aircraft of claim 1, wherein the upper primary skin of the fuselage comprises at least one cut-out, and wherein a center portion of the at least one funnel-shaped lower firewall is arranged inside of the at least one cut-out.

* * * * *